United States Patent
Hiller et al.

(10) Patent No.: US 9,249,686 B2
(45) Date of Patent: Feb. 2, 2016

(54) HOUSING AND TURBOMACHINE

(71) Applicant: MTU Aero Engines GmbH, Munich (DE)

(72) Inventors: Sven Hiller, Roehrmoos (DE); Erwin Bayer, Dachau (DE); Peter Geiger, Munich (DE); Thomas Hess, Munich (DE)

(73) Assignee: MTU Aero Engines GmbH, Munich (DE)

( * ) Notice: Subject to any disclaimer, the term of this patent is extended or adjusted under 35 U.S.C. 154(b) by 351 days.

(21) Appl. No.: 13/793,522

(22) Filed: Mar. 11, 2013

(65) Prior Publication Data

US 2013/0236300 A1 Sep. 12, 2013

(30) Foreign Application Priority Data

Mar. 12, 2012 (EP) .................................... 12159047

(51) Int. Cl.
*F04D 27/00* (2006.01)
*F01D 25/24* (2006.01)
*F01D 25/10* (2006.01)
*F01D 25/14* (2006.01)
*F04D 27/02* (2006.01)

(52) U.S. Cl.
CPC ............... *F01D 25/24* (2013.01); *F01D 25/10* (2013.01); *F01D 25/14* (2013.01); *F04D 27/023* (2013.01); *F04D 27/0238* (2013.01); *Y02T 50/671* (2013.01); *Y02T 50/675* (2013.01)

(58) Field of Classification Search
CPC ... F04D 27/0238; F04D 27/023; F01D 25/24; F01D 25/10; F01D 25/14; Y02T 50/675; Y02T 50/671

USPC ......................................................... 415/58.5
See application file for complete search history.

(56) References Cited

U.S. PATENT DOCUMENTS

| | | | |
|---|---|---|---|
| 3,339,832 A | 9/1967 | Duecker | |
| 3,344,606 A | 10/1967 | Abernethy | |
| 5,607,284 A * | 3/1997 | Byrne et al. | ................. 415/58.5 |
| 5,779,436 A | 7/1998 | Glezer et al. | |
| 6,454,529 B1 | 9/2002 | Zaerbaugh et al. | |
| 7,077,623 B2 | 7/2006 | Guemmer | |
| 9,074,605 B2 | 7/2015 | Bouru et al. | |
| 2011/0085900 A1 | 4/2011 | Schuetz | |

FOREIGN PATENT DOCUMENTS

| | | |
|---|---|---|
| DE | 1476791 | 10/1969 |
| DE | 19734216 | 2/1998 |

(Continued)

*Primary Examiner* — Zelalem Eshete
(74) *Attorney, Agent, or Firm* — Davidson, Davidson & Kappel, LLC

(57) ABSTRACT

A housing for a turbomachine includes a peripheral wall delimiting an annular space and a fluid conveying system for redirecting a partial flow of a main flow, which has an axial channel, a front annular channel and a rear annular channel in fluid connection with the axial channel and having a front annular space opening and a rear annular space opening. The fluid conveying system has a front valve device and a rear valve device controllable independently of the front valve device, for opening and closing the annular space openings, and an outlet opening for tapping the partial flow from the fluid conveying system. In the closed state of the rear annular space opening, the partial flow is directable through the rear annular channel and, in the closed state of the front annular space opening, the partial flow is directable through the front annular channel.

13 Claims, 9 Drawing Sheets

(56) References Cited

FOREIGN PATENT DOCUMENTS

| | | |
|---|---|---|
| EP | 1 382 855 | 1/2004 |
| FR | 2949518 | 3/2011 |
| WO | WO 2009/143820 | 12/2009 |

\* cited by examiner

1

B-B

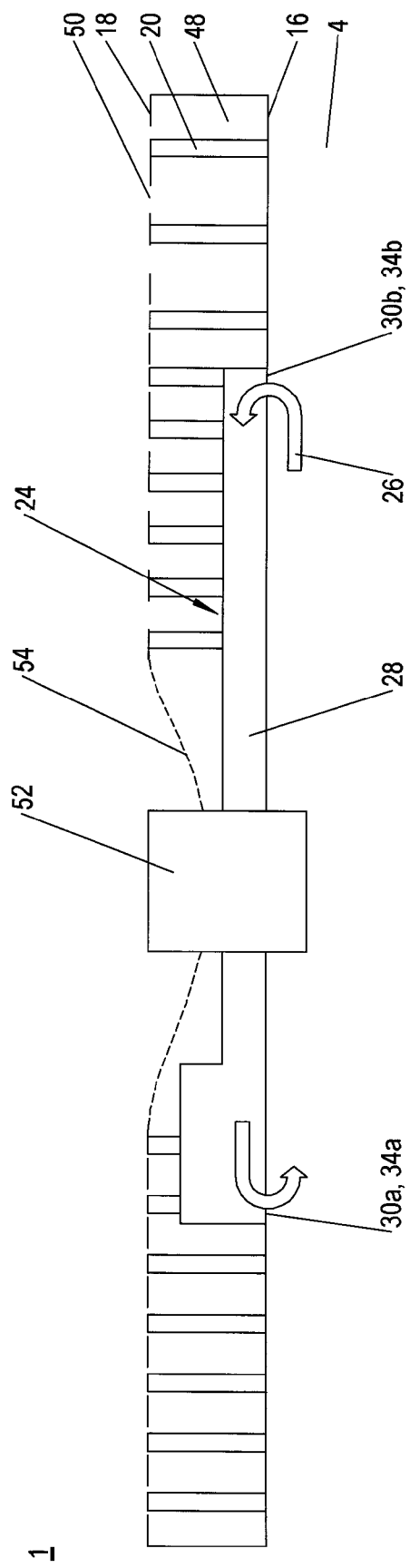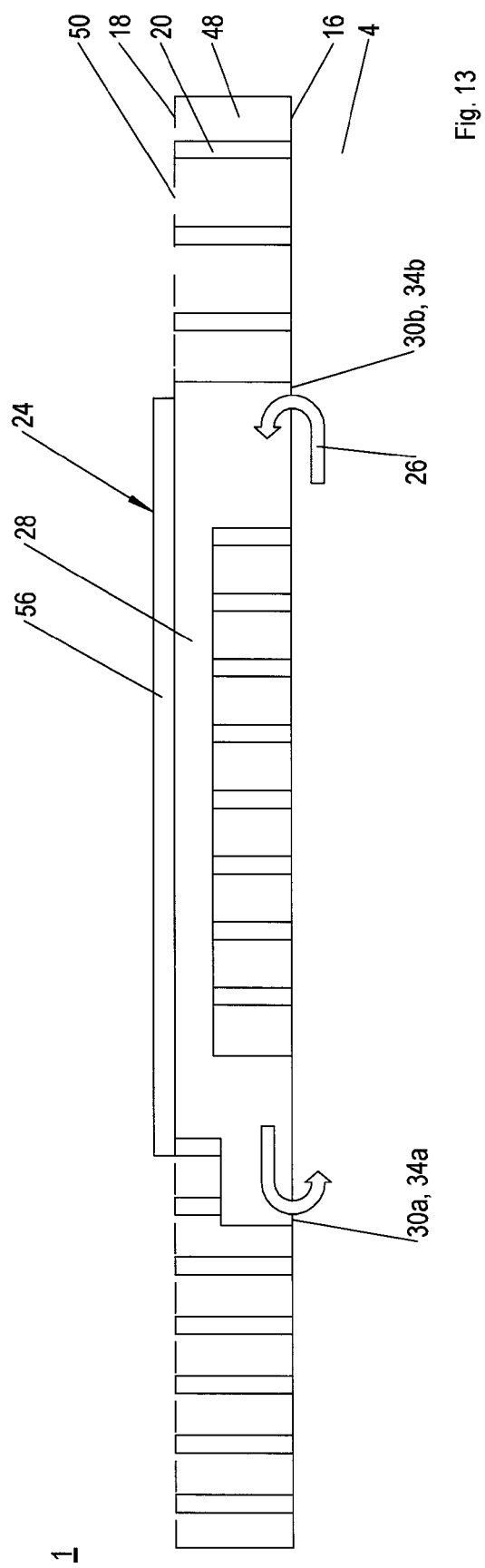

HOUSING AND TURBOMACHINE

This claims the benefit of European Patent Application EP 12 159 047.5, filed Mar. 12, 2012, and hereby incorporated by reference herein.

The present invention relates to a housing for a turbomachine as well as a turbomachine.

BACKGROUND

To increase the aerodynamic stability in turbomachines such as jet engines or stationary gas turbines, it is known to expand the so-called pumping limit of compressors. For this purpose, an airflow is usually blown into the main flow in the blade tip area of a front rotating blade row. The airflow, as shown in WO 2009/143820 A2, may be an external airflow or, as shown in patent EP 1 382 855 B1, a partial flow which was bled from the main flow in the area of a rear compressor stage. In general, complex external tubing is necessary to obtain and supply the airflow to be blown in.

To increase the thermal stability of a turbomachine, it is known to provide an active clearance control (ACC), in particular on turbines, to set a radial clearance of the rotating blade tips in relation to the turbine housing. Such a clearance control is shown for example in U.S. Pat. No. 6,454,529 B1. This known clearance control has a plurality of plate-like annular segments which have an external tubing for supplying a cooling airflow to the turbine housing bled on the compressor side. The problems with this clearance control are, however, the great complexity of the device and assembly as well as a significant weight increase of the turbomachine due to the tubing.

SUMMARY OF THE INVENTION

It is an object of the present invention to provide a housing for a turbomachine which reduces or eliminates the abovementioned disadvantages and enables a high aerodynamic and thermal stability. Furthermore, it is an alternate or additional object of the present invention to provide a turbomachine having an improved operating behavior.

A housing according to the present invention for a turbomachine, in particular a jet engine, has a peripheral wall for delimiting an annular space, through which a main flow may flow, as well as a fluid conveying system for redirecting a partial flow of the main flow. The fluid conveying system has an axial channel, a front integral annular channel, as well as a rear integral annular channel which are in fluid connection with the axial channel and which have a front annular space opening and a rear annular space opening. According to the present invention, a front valve device and a rear valve device, which is controllable independently of the front valve device, for opening and closing the annular space openings, and an outlet opening for tapping the partial flow from the fluid conveying system are provided. The valve devices are designed in such a way that in the activated state of the rear annular space openings the partial flow is directable through the rear annular channel and, in the closed state of the front annular space opening, the partial flow is directable through the front annular space.

The housing according to the present invention allows the use of a single tubing to improve the aerodynamic stability and to improve the thermal stability of a turbomachine. It is not necessary to have two separate tubings for the aerodynamic and the thermal stabilizations. In this way, the device complexity, the housing assembly and the housing disassembly, as well as the total weight of the housing, are reduced, in particular. The housing according to the present invention is therefore very compact and light despite the fluid conveying system. The housing according to the present invention allows an improvement of the aerodynamic stability of a turbomachine, since a partial flow may be tapped, for example, by the fluid conveying system in the area of a rear compressor stage and blown into the area of a front compressor stage. In addition, the housing according to the present invention allows an improvement of the thermal stability, since the integral annular channels or the annular channels which are at least partially integrated into the housing may be used as cooling or heating channels, thus making it possible, at least for the housing areas, in which the annular channels are located, to be cooled or heated individually. A housing area which is close to the rear annular channel may, for example, be cooled on a front compressor stage as a result of tapping the partial flow. In contrast, a housing area which is close to the front annular channel may be heated on a rear compressor stage as a result of tapping the partial flow. The thermal stabilization or control is important in particular during transient processes, e.g., during an acceleration and a deceleration, and may considerably influence the operating behavior of the compressor. Being integrated into the housing, the annular channels form a joint wall or peripheral section and thus a large thermally active surface. They may be guided outside over the housing or be situated between an inner and an outer wall of the housing. Due to the fact that the valve devices are controllable individually, an optimal aerodynamic and thermal effect may be achieved, while the main flow in the annular space is impaired minimally. The housing is preferably manufactured using a generative manufacturing process such as laser sintering or laser melting. In this way, the housing and the channels may be optimally configured from the flow-related point of view in such a way that the partial flow tapping, the partial flow guidance, the housing flow, and the flow around the blades are improved. In addition, the housing may be designed optimally form the structural point of view. For example, the weight of the housing may be further optimized and/or the structure may have oscillation-damping properties due to the cellular structure. Due to the generative manufacture, it is possible to integrate the rear annular channel into the housing in such a way that the annular space is not axially elongated and the partial flow is tapped under little loss.

The thermally active surface may be enlarged when the axial channel is also used as a cooling channel or as a heating channel. Preferably, the axial channel is thus also integrated into the housing and thus forms a joint wall or peripheral section with the housing. Here, the axial channel may be guided outside over the housing or be situated between an inner and an outer wall of the housing. At the same time, the compactness of the housing is improved by the integral formation of the axial channel.

The thermal stability may be further improved if the axial channel also extends in the peripheral direction of the housing and is formed as a peripheral channel or annular channel, since in this way the housing is set thermally uniformly across its entire periphery in the area of the axial channel.

Alternatively, a plurality of axial channels may be provided which are distributed uniformly across the housing periphery. Due to the plurality of axial channels, a redundancy is additionally provided so that if one of the axial channels is damaged, the partial flow may be redirected through the remaining axial channels.

Preferably, the annular channels are each delimited to a compressor stage. In this way, the partial flow may be tapped from the annular space or blown into the annular space in a targeted manner only within one stage range. Alternatively, the annular channels may, however, also extend across multiple compressor stages.

To increase the flexibility of the fluid conveying system, at least one other annular channel having one annular space opening may be provided which is assigned an individually controllable valve device for opening and closing its annular space opening. The at least one other annular channel is preferably situated in the area of a compressor stage.

To further improve the thermal stability, the fluid conveying system may have at least one peripheral channel which is closed toward the annular space and which is in fluid connection with at least one of the channels. In this way, another housing area may be acted on by the at least one partial flow and thus be set thermally. It is conceivable, for example, that at least one peripheral channel of this type is provided in the area of the stationary blade accommodations on the housing side.

To cool the at least one partial flow, the at least one axial channel may have a cooling device pointing to the exterior surroundings. This cooling device may be cooling ribs integrated into the channel wall, for example.

For further aerodynamic and thermal stabilization, the fluid conveying system may have an outer opening for introducing an external fluid into the annular channels. The external fluid may be used both for aerodynamic stabilization, i.e., for being blown into the annular space, and for thermal stabilization, i.e., for cooling or heating a housing area.

To achieve a high aerodynamic stabilization with the aid of a small partial flow quantity, at least inlet valves of the valve devices may be pulsable.

To simplify the assembly and the disassembly, the housing is preferably composed of a plurality of segments. The segments are, for example, half shells, each of which extends across an angle range of 180°. The segments may, however, also each extend across an angle range <180°. The housing may, however, also be designed in such a way that it has a lower half shell and a plurality of upper individual segments. Alternatively, the housing may also be an annular housing which is closed on the periphery.

One preferred turbomachine is provided with a housing according to the present invention. In this way, it is possible to increase both the aerodynamic stability and the thermal stability of the turbomachine with little device complexity, thus improving the operating behavior of the turbomachine.

Other advantageous exemplary embodiments of the present invention are the subject matter of the other subclaims.

BRIEF DESCRIPTION OF THE DRAWINGS

In the following, preferred exemplary embodiments of the present invention are elucidated in greater detail with reference to the highly simplified schematic illustrations of the present invention.

FIG. 12 shows an axial section through the segment from FIG. 11, FIG. 13 shows an axial section through another exemplary double-walled housing variant.

DETAILED DESCRIPTION

Figure 1:
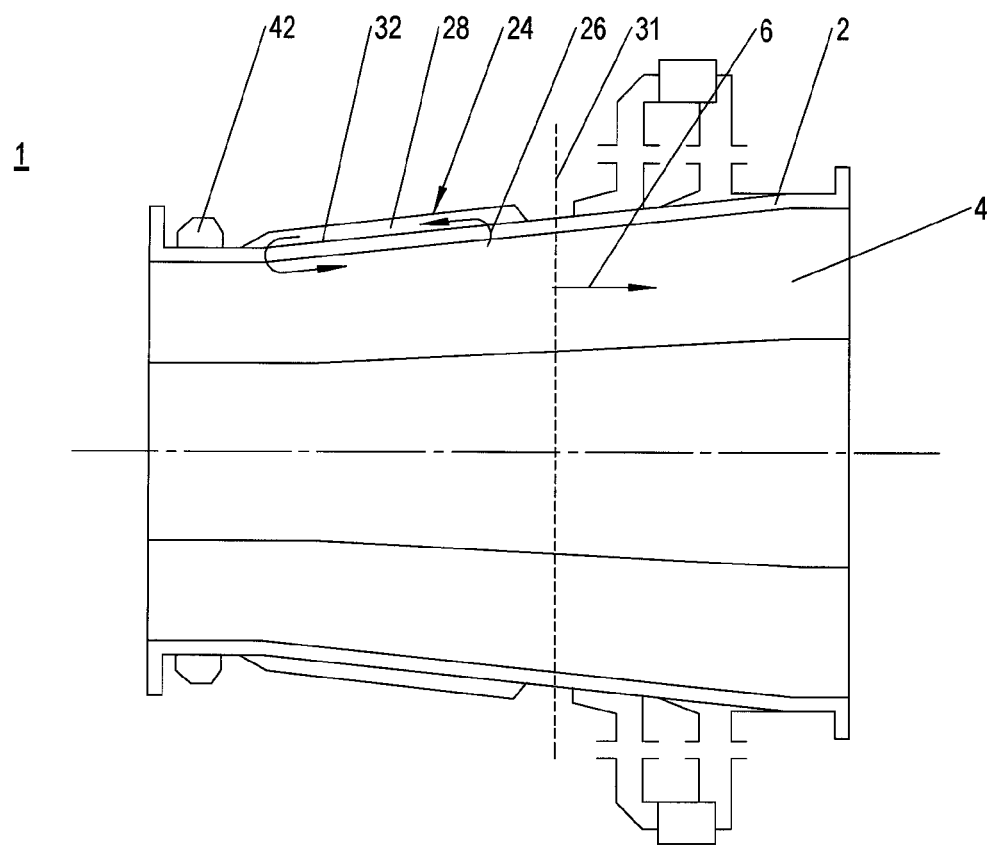
FIG. 1 shows an axial section through a housing according to the present invention for a turbomachine.

In the figures, identically constructed elements are denoted with identical reference numerals, for the sake of clarity only one element being preferably provided with a reference numeral in the case of multiple identically constructed elements in one figure.

FIG. 1 shows an axial section through a housing 1 according to the present invention of a turbomachine, i.e., a jet engine. Housing 1 is preferably manufactured generatively and situated on the compressor side. It has a peripheral wall 2 which expands conically in the flow direction and which delimits an annular space 4 through which a main flow 6 flows axially from left to right.

Figure 2:
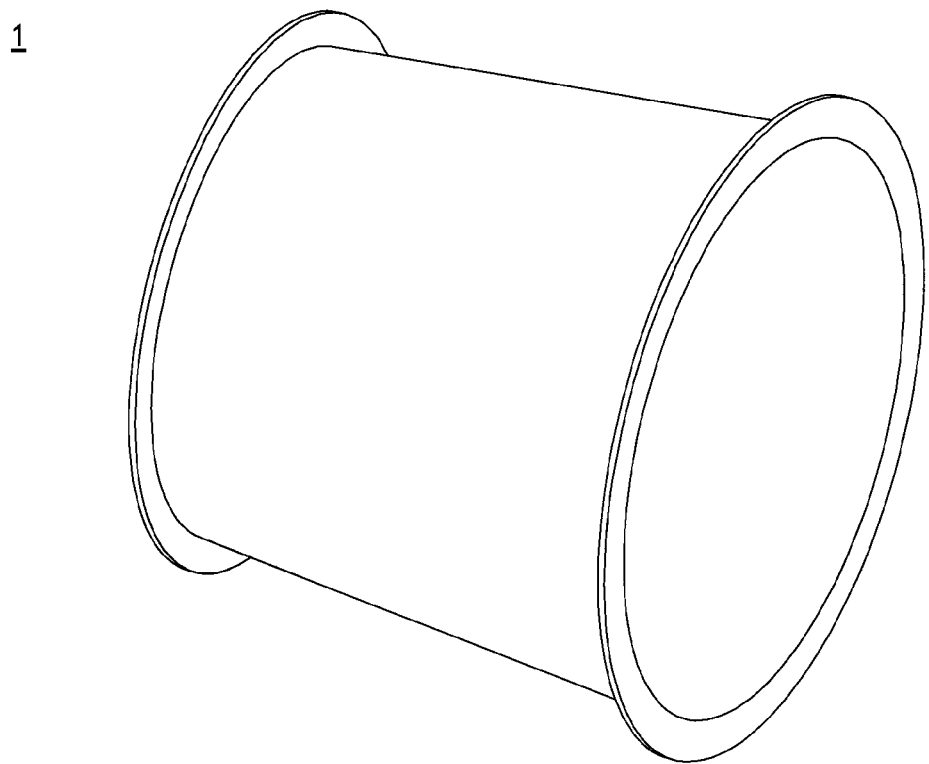
FIG. 2 shows a perspective illustration of a first exemplary housing variant.
Figure 3:
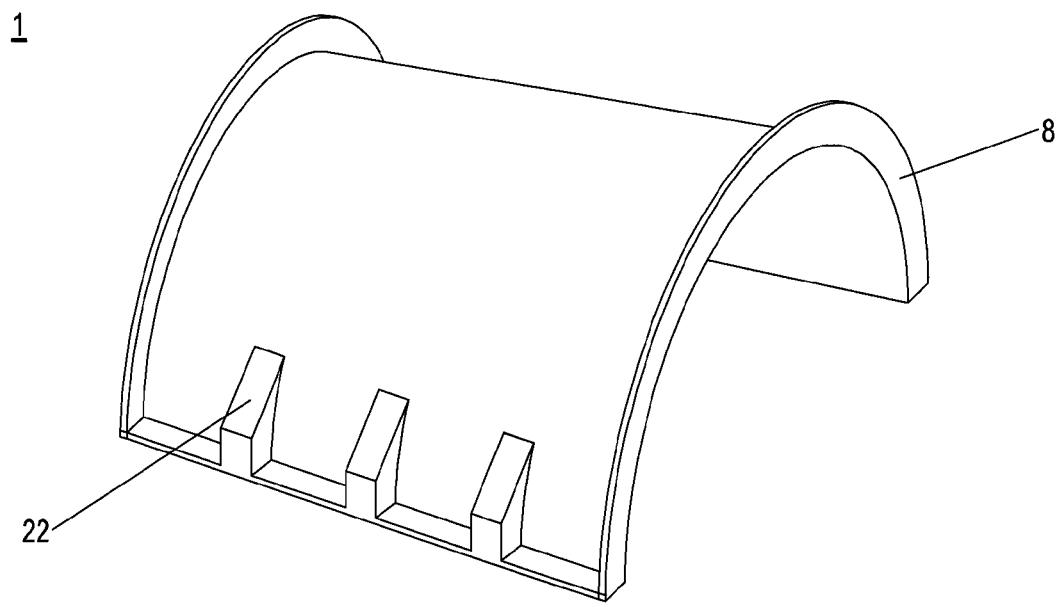
FIG. 3 shows a perspective illustration of a second exemplary housing variant.
Figure 4:
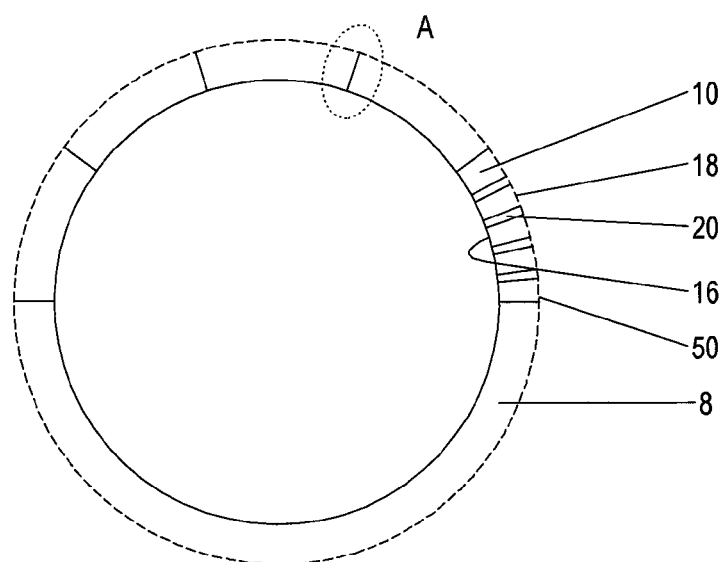
FIG. 4 shows a front view of a third exemplary housing variant.

According to the illustrations in FIGS. 2, 3, and 4, housing 1 is, for example, a one-part annular housing (FIG. 2) or a multi-part housing (FIGS. 3 and 4). Multi-part housing 1 may be composed of an upper half shell 8 and a lower half shell (not shown) having an angle range of 180° in each case (FIG. 3) or of a lower half shell 8 and a plurality of upper individual segments 10 having an angle section which is smaller than 180° (FIG. 4). Naturally, housing 1 may also be exclusively composed of a plurality of individual segments 10 having an angle section which is smaller than 180° (not shown). The connection of individual segments 10 or 10a, 10b to form housing 1 may take place according to FIG. 5 via lateral plug-on flanges, for example, which are formed by two lateral connecting elements, such as hooks 12, 14, which may be engaged in a form-locked manner. To radially seal annular space 4, individual segments 10 are accordingly sealed against one another. Alternatively, individual segments 10 are welded to one another. A suitable welding process is, for example, the electron beam welding.

Peripheral wall 2 of housing 1 may be single-walled or multi-walled (FIGS. 1, 2, and 3). If housing 1 is multi-walled, it may, for example, have an inner peripheral wall 16, an outer peripheral wall 18, as well as a supporting structure 20 for spacing apart and connecting walls 16, 18, as shown in FIG. 4.

For stabilization purposes, housing 1 may have reinforcement ribs 22 on the side of its outer periphery (FIG. 3), regardless of whether it is single- or multi-walled.

As shown in FIG. 1, housing 1 is provided with a fluid conveying system 24 for redirecting a partial flow 26 of main flow 6. In particular, fluid conveying system 24 or the redirection of partial flow 26 is used for the aerodynamic stabilization and for the thermal stabilization of the turbomachine. Fluid conveying system 24 is preferably structurally integrated into housing 1 and is formed directly during the manufacture of housing 1, which is generative in particular.

Figure 6:
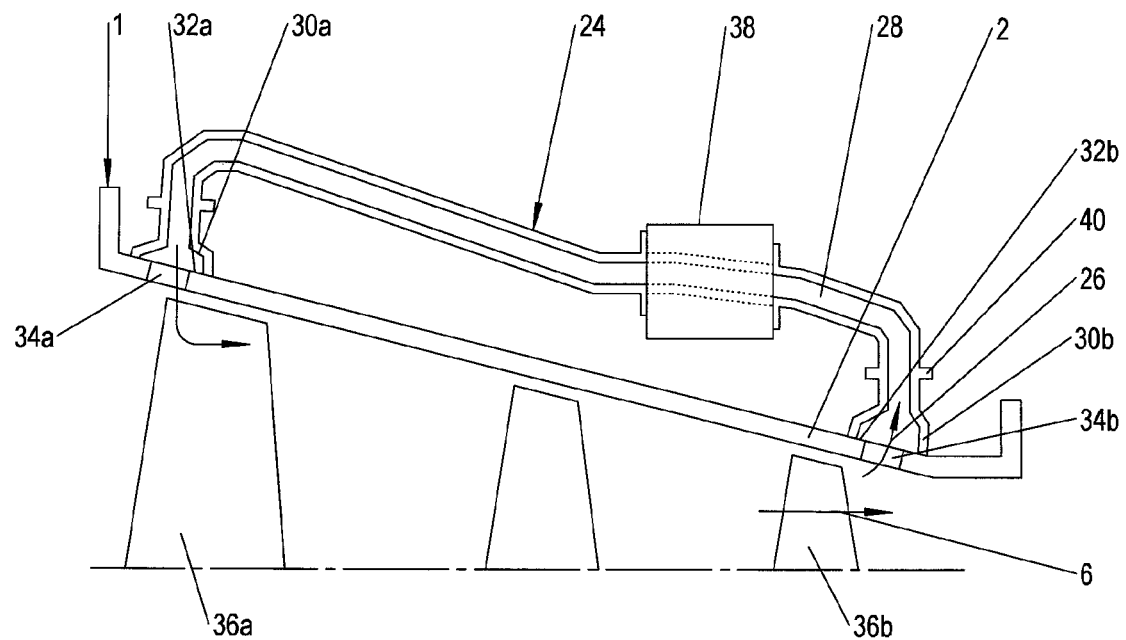
FIG. 6 shows an exemplary fluid conveying system variant.

As shown in FIG. 6, fluid conveying system 24 has a plurality of axial channels 28, an upstream or front integral annular channel 30a and a downstream or rear integral annular channel 30b. Axial channels 28 are identical individual tubes which extend in the axial direction and are preferably distributed uniformly across the housing periphery. Axial channels 28 end in annular channels 30a, 30b and may be spaced apart from peripheral wall 2 (see also the exemplary illustration on the right of vertical auxiliary line 31 in FIG. 1) or integrated into housing 1 in such a way that peripheral wall 2 forms a wall section 32 of axial channels 28 in each case (see the exemplary illustration on the left of vertical auxiliary line 31 in FIG. 1).

Annular channels 30a, 30b enclose housing 1 and are integrated into housing 1 according to FIG. 6 in such a way that peripheral wall 2 forms a wall section 32a, 32b of annular channels 30a, 30b in each case. Annular channels 30a, 30b each have an annular space opening 34a, 34b penetrating wall sections 32a, 32b. Annular space openings 34a, 34b may be formed as a plurality of individual openings or, for example, as one slot-like annular space opening which extends in the peripheral direction in each case.

In the exemplary embodiment shown in FIG. 6, two annular channels 30a, 30b are each situated in the area of one compressor stage 36a, 36b of the turbomachine and are spaced apart from one another via an intermediary stage. Annular channels 30a, 30b are preferably positioned in relation to compressor stages 36a, 36b in such a way that front annular space opening 34a is situated in the front edge area of the rotating blades of front compressor stage 36a, and rear annular space opening 34b is situated in the rear edge area of the stationary or rotating blades of rear compressor stage 36b. Annular channels 30a, 30b may, however, also extend across multiple compressor stages 36a, 36b (not shown). Likewise, a plurality of annular channels 30, 30b is conceivable which are each assigned to a compressor stage 36a, 36b (cf. FIG. 14).

To open and close annular space openings 34a, 34b and thus to tap and to blow in partial flow 26, one valve device having at least one inlet valve and at least one outlet valve is situated in front annular channel 30a and in rear annular channel 30b in each case (not illustrated in FIG. 6 for clarity, see FIGS. 15 through 19). In this way, partial flow 26 may be tapped via rear annular channel 30b, as illustrated in the drawing, and blown in via front annular channel 30a for stabilization. Alternatively, partial flow 26 may be used to heat housing 1 in the area of front compressor stage 36a or to cool housing 1 in the area of rear compressor stage 36b. To heat housing 1 in the area of front compressor stage 36a, front annular space opening 34a is closed and partial flow 26 bled via rear annular channel 30b is redirected into front annular channel 30a. To cool housing 1 in the area of rear compressor stage 36b, rear annular space opening 34b is closed and partial flow 26 bled via front annular channel 30a is redirected into rear annular channel 30b. "Closed" means that the flow can pass in the direction opposite the open position.

Additionally, a valve device 38 may be provided in axial channel(s) 28 for opening and closing axial channel(s) 28. To supply an external fluid flow to fluid conveying system 24 and to tap partial flow 26, at least one connecting piece 40 is provided in the area of channels 28, 30a, 30b.

Figure 7:
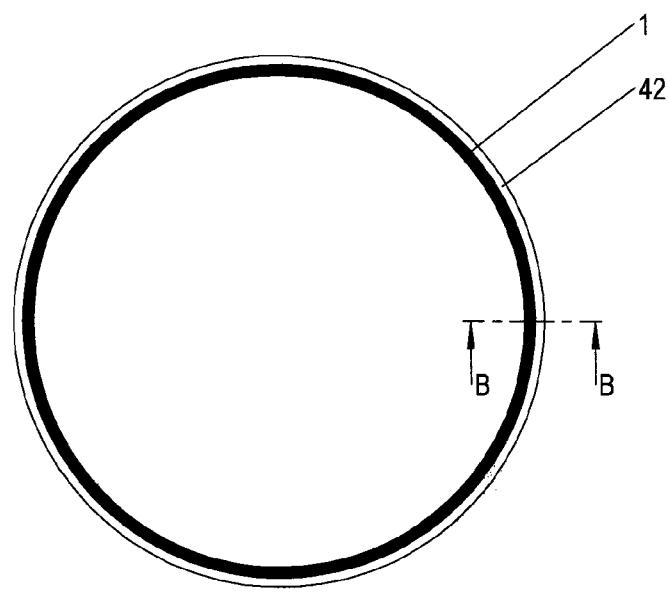
FIG. 7 shows a cross section through the housing from FIG. 1 in the area of a peripheral channel.
Figure 8:
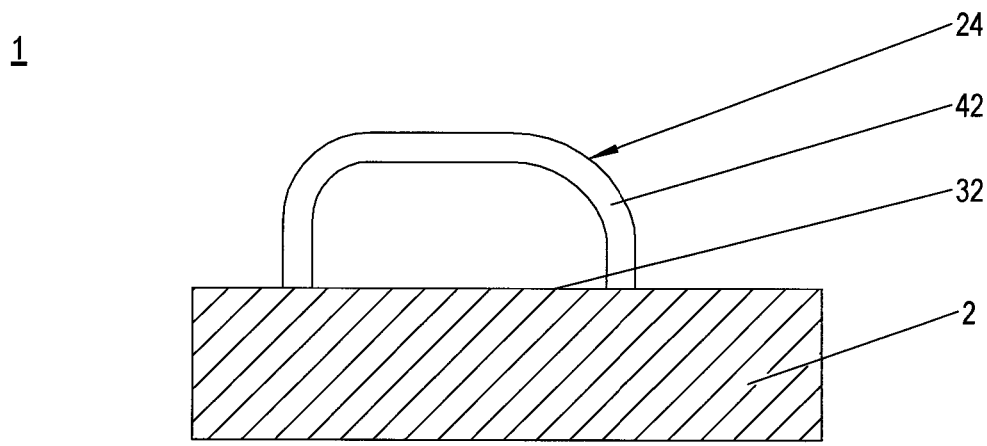
FIGS. 8 and 9 show sectional illustrations of the peripheral channel.
Figure 9:
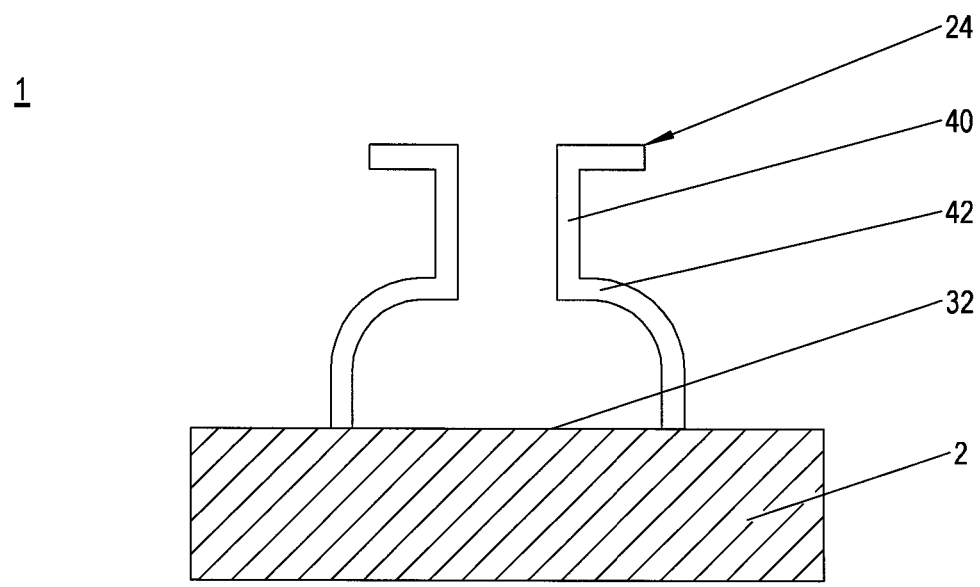

As shown in FIG. 1 as well as in FIGS. 7 and 8, fluid conveying system 24 may in addition have at least one peripheral channel 42 for thermally setting a housing area and, in particular, for actively controlling the clearance in the area of the blade tips. Peripheral channel 42 is in fluid connection with axial channel 28 or with at least one of annular channels 30a, 30b and at least one of its wall sections 32 is integrated into peripheral wall 2. Annular space openings 34a, 34b, such as the ones in annular channels 30a, 30b for opening peripheral channel 42 toward annular space 4, are not provided. However, it may have a connecting piece 40 for supplying an external fluid flow or for tapping partial flow 26, as shown in FIG. 9. Naturally, connecting piece 40 may be opened and closed via a valve device (not illustrated) or closed off using a cover.

Figure 10:
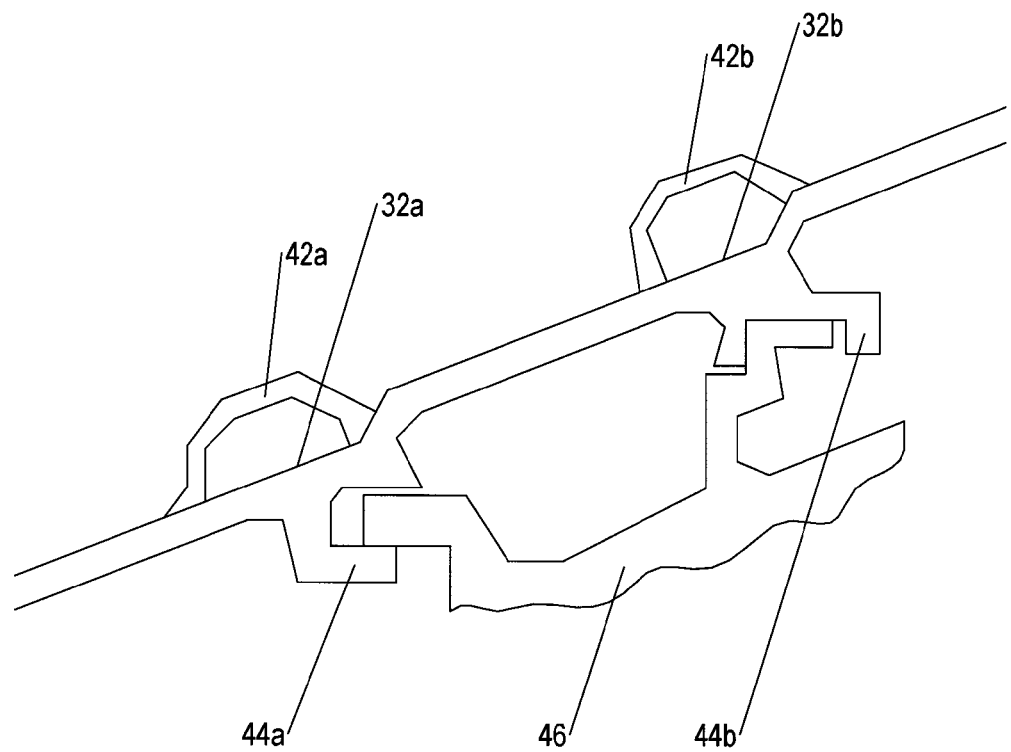
FIG. 10 shows exemplary peripheral channels in the turbine area.

An exemplary positioning of two peripheral channels 42a, 42b is shown in detail in FIG. 10. Small housing areas are thermally critical in low-pressure turbines, in particular. An exemplary housing area is that area in which hooks 44a, 44b are positioned for fastening stationary blades 46. This housing area, which is subjected to great thermal stresses, may be supplied with cooling air in a targeted manner through integrated peripheral channels 42a, 42b. The cooling air may in this case be either partial flow 26 or else an externally supplied fluid flow.

Figure 5:
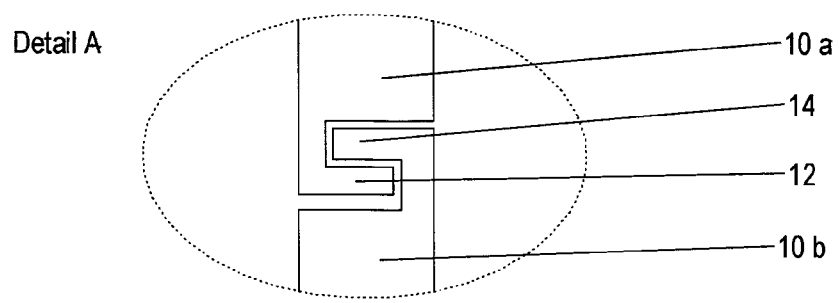
FIG. 5 shows a detailed illustration of the third housing variant.
Figure 11:
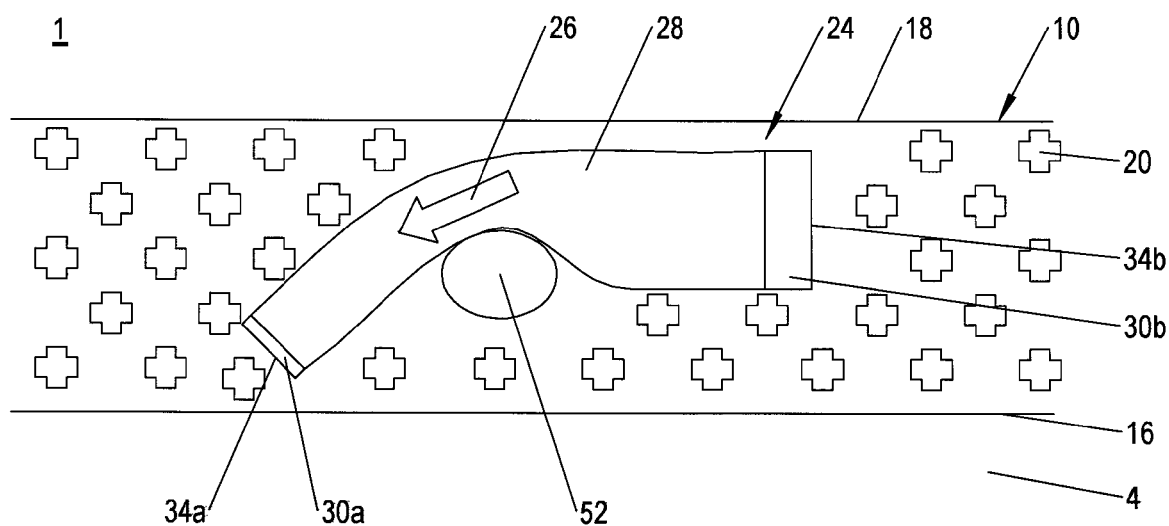
FIG. 11 shows a top view of a segment of an exemplary double-walled housing variant having a fluid conveying system variant.

One exemplary embodiment of a double-walled housing 1 having an integrated fluid conveying system 24 is shown in FIGS. 11 and 12. Housing 1 is preferably composed of a plurality of individual segments 10, as shown in FIGS. 4 and 5. It has an inner peripheral wall 16, delimiting an annular space 4, and an outer peripheral wall 18 which are spaced apart from one another and connected to one another via a supporting structure 20. Housing 1 having fluid conveying system 24 is preferably manufactured in a generative manner. To remove powder residue from a gap 48 between inner peripheral wall 16 and outer peripheral wall 18, a plurality of breakthroughs 50 are introduced into outer peripheral wall 18. Supporting structure 20 is preferably cellular in nature and has oscillation-damping properties.

Fluid conveying system 24 has an axial channel 28 which extends across the entire housing periphery of mounted housing 1 between peripheral walls 16, 18. It is thus formed as an integral peripheral channel or annular channel. On its end sides, axial channel 28 ends in a front annular channel 30a and in a rear annular channel 30b which are each provided with a ring-like annular space opening 34a, 34b. Rear annular channel 30b preferably has a larger cross section compared to front annular channel 30a. To reduce the overall height of housing 1, it has an indentation 54 for accommodating an adjusting drive 52 for a guide baffle. The cross section of the axial channel is reduced upstream from adjusting drive 52. To open and close annular space openings 34a, 34b and/or axial channel 28, fluid conveying system 24 has valve devices (not shown here for clarity). As shown in FIGS. 11 and 12, partial flow 26 is, for example, tapped from annular space 4 in the area of rear annular space opening 34b and blown back into annular space 4 via front annular space opening 34a for aerodynamic stabilization.

In one exemplary embodiment shown in FIG. 13 of a double-walled housing 1, a cooling device 56 in the form of cooling ribs is situated instead of an adjusting drive 52 for a guide baffle in contrast to the exemplary embodiment according to FIG. 12. Cooling device 56, which points to the exterior surroundings, forms a section of axial channel 28, which is situated on the outer periphery, and accomplishes a cooling of partial flow 26 in the case of a flow through axial channel 28.

Naturally, cooling device 56 and adjusting drive 52 may also be combined in one exemplary embodiment.

Figure 14:
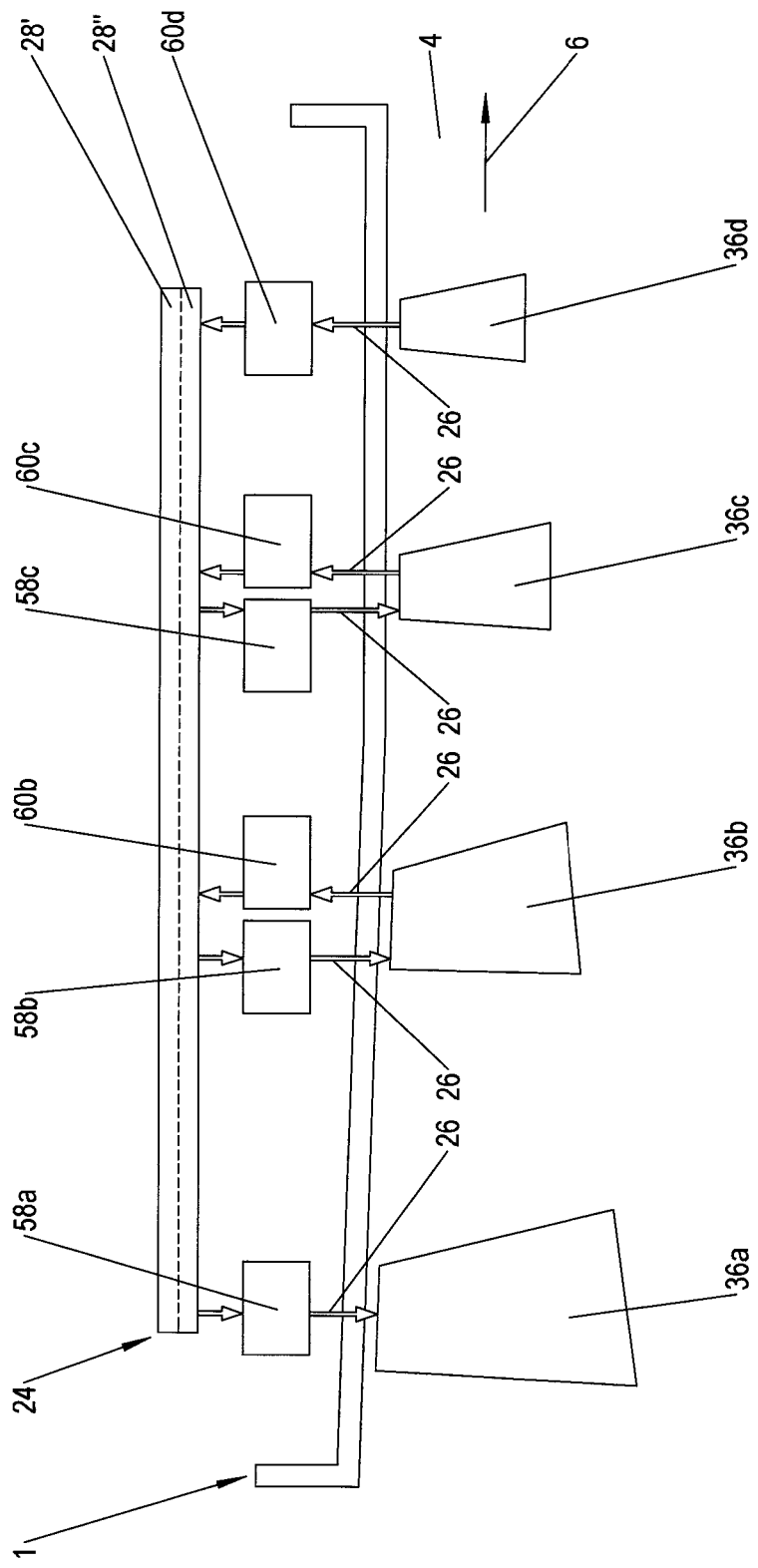
FIG. 14 shows an exemplary connection scheme of a fluid conveying system variant.

In FIG. 14, a principle connection scheme of a fluid conveying system 24 according to the present invention for redirecting a partial flow 26 is integrated into a housing 1 of a four-stage compressor of a turbomachine. Fluid conveying system 24 has at least two coaxial peripheral channels 28', 28" which extend across all compressor stages 36a, 36b, 36c, 36d. In the area of first compressor stage 36a, a valve device is situated which has at least one inlet valve 58a for blowing partial flow 26 and/or an external fluid flow into annular space 4 and thus into main flow 6. In the area of second stage 36b, a valve device is provided which has at least one inlet valve 58b as well as at least one outlet valve 60b for blowing partial flow 26 and/or an external fluid flow in and out. In the area of third stage 36c, a valve device is provided which has at least one inlet valve 58c as well as at least one outlet valve 60c. In the area of fourth stage 36d, a valve device is situated which has at least one outlet valve 60d.

Due to the arrangement of multiple axial channels 28 and 28', 28" as well as annular channels 30 or 30a, 30b, 30c, 30d (See FIGS. 17, 18), there is a redundancy on the one hand and thus an increased operational reliability in the case of failure of individual channels 28, 30 or valves 58 or 58a, 58b, 58c and 60 or 60b, 60c, 60d. On the other hand, different pairs of a partial flow redirection may be implemented and fluid conveying system 24 may be operated across all stages.

Valves 58, 60 may be switched and controlled individually. Particular partial flow 26 may thus be controlled. Valves 58, 60 are configured in such a way that they have short response times. In this way, it is, for example, possible to rapidly blow in a large partial flow quantity to stabilize main flow 6 in the case of a diagnosed stability disorder (starting pumping and the like) and, during the then achieved stable state, only a minimally needed partial flow quantity may be blown in. Inlet valves 58 are preferably operable in a pulsable manner so that a great aerodynamic stability may be generated using a small quantity of partial flow 26.

Sensors such as pressure and temperature sensors are preferably integrated into channels 28, 30, 42 and housing 1. These sensors act on the one hand as control variables for the metering of partial flow 26 or of the external fluid flow and on the other hand for error detection. For example, redundancies may be eliminated or reduced in this way.

In the following, individual exemplary switching positions of fluid conveying system 24 are shown. An aerodynamic stabilization takes place in FIGS. 15, 16, and 17, and a thermal stabilization takes place in FIGS. 18 and 19. Fluid conveying system 24 according to the present invention, however, allows simultaneous aerodynamic and thermal stabilization.

Figure 15:
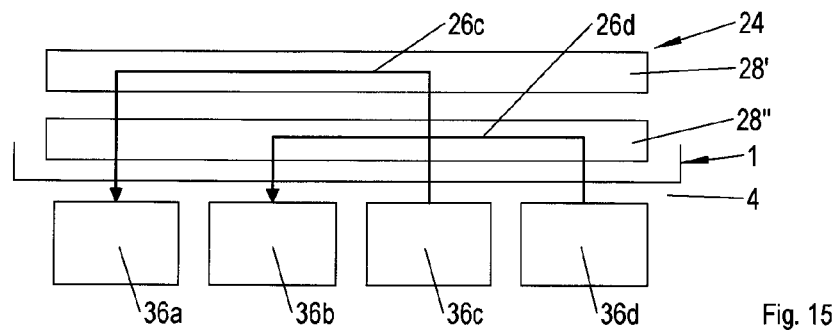
FIGS. 15 through 19 show exemplary switching positions of the fluid conveying system variant from FIG. 14.

In FIG. 15, a partial flow 26c is, for example, tapped on third stage 36c and a partial flow 26d is tapped on fourth stage 36d, and in the area of first stage 36a or second stage 36b it is blown into annular space 4 for aerodynamic stabilization. Partial flow 26c is in this case guided through axial channel 28' and partial flow 26d is guided through axial channel 28".

Figure 16:
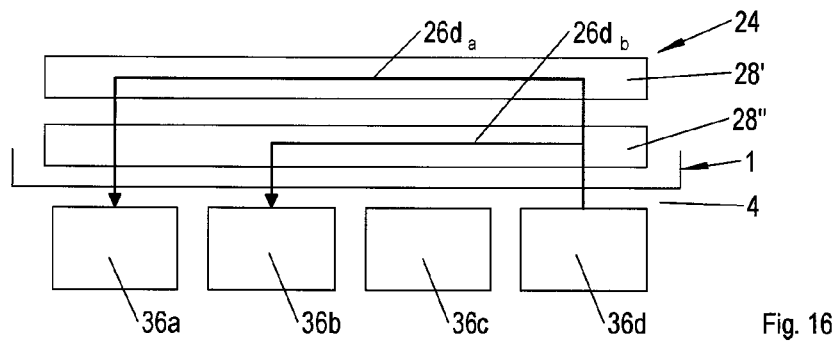

In the exemplary embodiment shown in FIG. 16, a partial flow 26d is, for example, tapped exclusively in the area of fourth stage 36d. Partial flow 26d is then guided to first stage 36a and to second stage 36b as separate partial flows $26d_a$, $26d_b$, and is there blown into annular space 4 for aerodynamic stabilization. Partial flow $26d_a$ is in this case guided through axial channel 28' and partial flow $26d_b$ is guided through axial channel 28".

Figure 17:
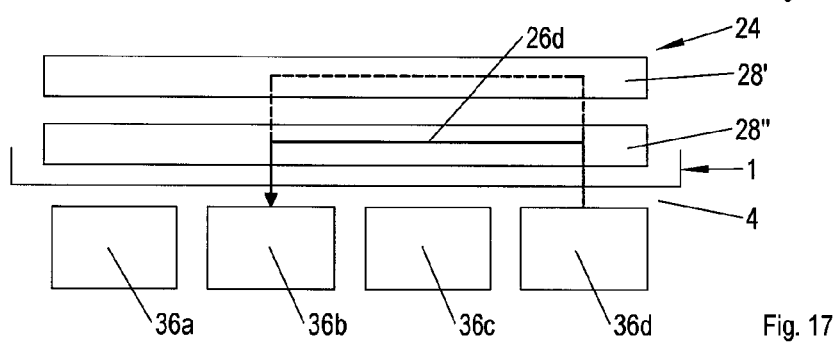

In the exemplary embodiment shown in FIG. 17, a partial flow 26 is, for example, tapped in the area of fourth stage 36d and blown into annular space 4 via axial channel 28" in the area of second stage 36b for aerodynamic stabilization. Alternatively, partial flow 26 may also be guided through axial channel 28', as illustrated by different types of lines.

Figure 18:
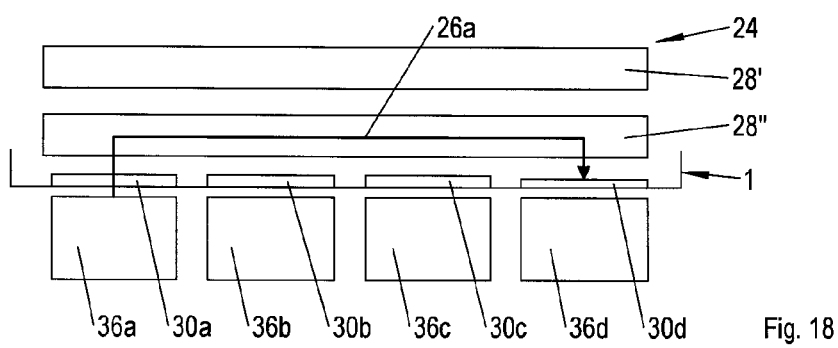

FIG. 18 shows one exemplary embodiment in which a cooling of a housing area takes place in the area of fourth stage 36d. By cooling housing 1, it is possible to thermally influence housing 1 in the necessary areas in the particular operating state and thus to control the radial clearance. This is important in particular during transient processes, e.g., during an acceleration and a deceleration, and may considerably influence the operating behavior of the compressor. For this purpose, a partial flow 26a is bled in the area of first stage 36a and blown via an axial channel 28" into rear annular channel 30d of fourth compressor stage 36d closed toward annular space 4, without entering annular space 4. In this way, a clearance increase on rear stage 36d and thus an efficiency drop may be reduced, for example, in the case of an acceleration. To tap partial flow 26 from particular annular channel 30a, 30d, an outlet opening is provided in each case. Partial flow 26 tapped from fluid conveying system 24 may, for example, be further used as bleed air for aircraft cabin-related applications.

Figure 19:
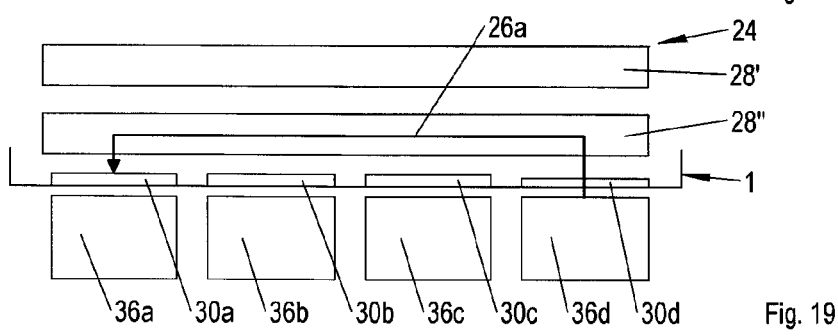

FIG. 19 shows one exemplary embodiment of a housing heat-up during which a partial flow 26d is tapped in the area of fourth stage 36d and blown via axial channel 28" into front closed annular channel 30a, without entering annular space 4. In this way, a shrinking of a still hot rotor, which is thermally more inert in relation to thin-walled housing 1, may, for example, be prevented during deceleration or a braking action of the turbomachine.

Figure 20:
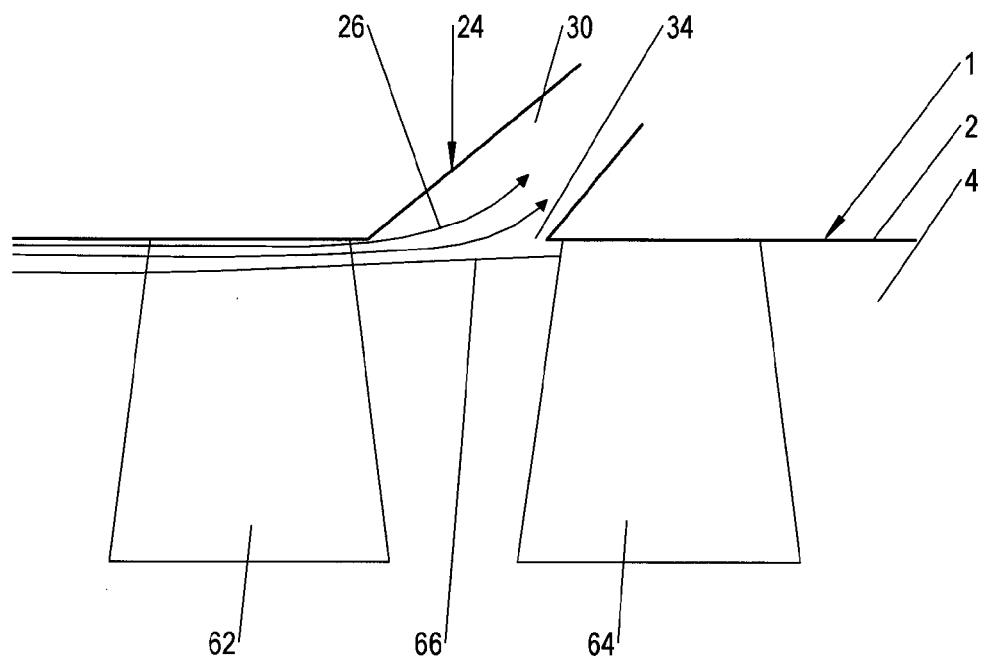
FIG. 20 shows a housing-side boundary layer suction in an axial section.

FIG. 20 shows one exemplary embodiment in which fluid conveying system 24 is used for boundary layer suction in the side-wall area or in the area of peripheral wall 2 of annular space 4. Partial flow 26 is therefore formed by the boundary layer which has been sucked off. The suction takes place between a stationary blade row 62 and a rotating blade row 64 and results in an improved rotor inflow 66. With the aid of the generative process, annular space opening 34 of the particular annular channel may be integrated into housing 1 in terms of flow and structure in such a way that the boundary layer removal takes place under relatively little loss, and in addition an axial elongation of annular space 4 is prevented. Partial flow 26 may, for example, be used as bleed air for aircraft cabin-related applications.

Figure 21:
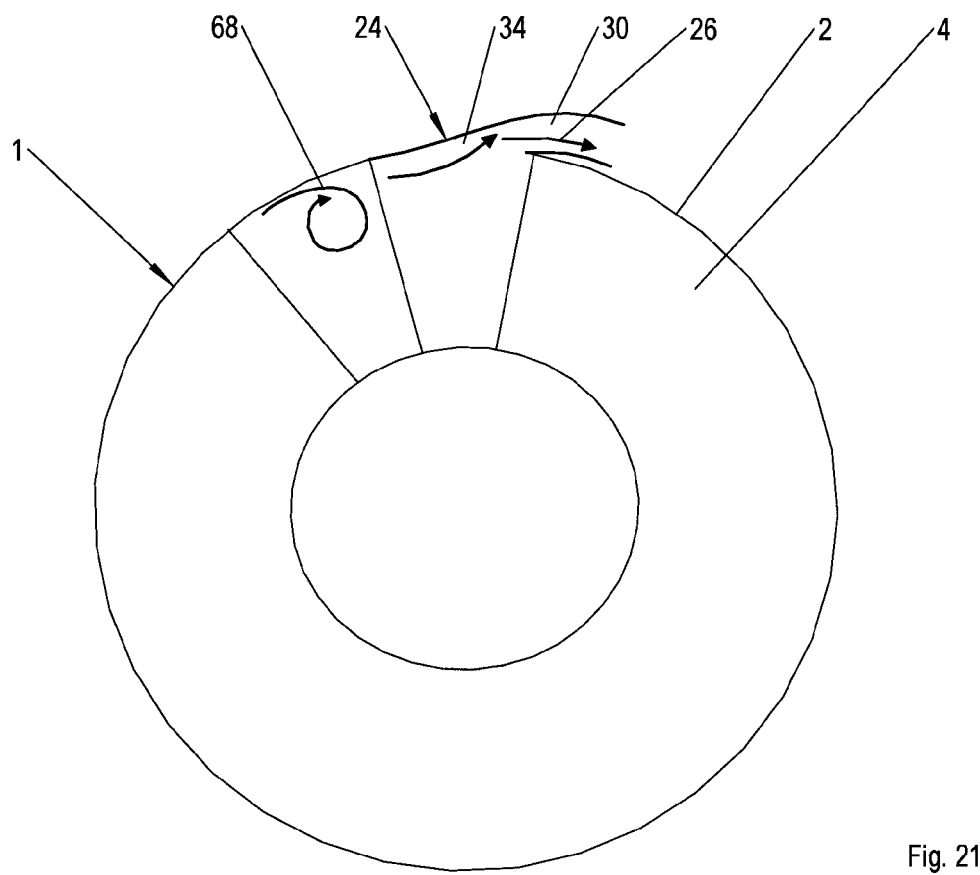
FIG. 21 shows an upstream view of a rotor which is mounted in a housing.

FIG. 21 shows an exemplary embodiment in which partial flow 26 is formed by a secondary flow which has been sucked off. A reduction of the secondary flow in the area of inner peripheral wall 16 has a positive effect downstream on the boundary layer. A turbulence 68 is effectively prevented, whereby efficiency losses are reduced on the one hand and the aerodynamic stability is increased on the other hand.

Disclosed is a housing for a turbomachine, in particular a jet engine, including a peripheral wall for delimiting an annular space through which a main flow may flow, and including a fluid conveying system for redirecting a partial flow of the main flow, which has an axial channel, a front annular channel and a rear annular channel which are in fluid connection with the axial channel and which have a front annular space opening and a rear annular space opening, the fluid conveying system having a front valve device and a rear valve device, which is controllable independently of the front valve device, for opening and closing the annular space openings, and an outlet opening for tapping the partial flow from the fluid conveying system, and in the closed state of the rear annular space opening, the partial flow being directable through the rear annular channel and, in the closed state of the front annular space openings the partial flow being directable through the front annular channel, as well as a turbomachine having a housing of this type.

LIST OF REFERENCE NUMERALS 1 housing
2 peripheral wall
4 annular space
6 main flow
8 half shell
10, 10a, 10b individual segment
12 connecting element
14 connecting element
16 inner peripheral wall and
18 outer peripheral wall
20 supporting structure
22 reinforcement rib
24 fluid conveying system
26, 26a, c, d, $d_a$, $d_b$ partial flow
28, 28', 28" axial channel
30, 30a, b, c, d annular channel
31 auxiliary line
32, 32a, b wall section
34a, b annular space opening
36a, 36b, c, d compressor stage
38 valve device
40 connecting piece, outlet opening
42, 42a, b peripheral channel
44a, b hook
46 stationary blade
48 gap
50 breakthrough
52 adjusting drive
54 indentation
56 cooling device
58, 58a, b, c inlet valve
60, 60b, c, d outlet valve
62 stationary blade row
64 rotating blade row
66 rotor inflow
68 turbulence

What is claimed is:

1. A housing for a turbomachine, comprising:
a peripheral wall delimiting an annular space through which a main flow may flow; and
a fluid conveying system for redirecting a partial flow of the main flow, the fluid conveying system including an axial channel, a front integral annular channel and a rear integral annular channel in fluid connection with the axial channel, the front integral annular channel having a front annular space opening and the rear integral annular channel having a rear annular space opening, the fluid conveying system further including a front valve device and a rear valve device controllable independently of the front valve device, for opening and closing the front and rear annular space openings respectively, and an outlet opening for tapping the partial flow from the fluid conveying system,
in the closed state of the rear annular space opening, the partial flow being directable through the rear annular channel and, in the closed state of the front annular space opening, the partial flow being directable through the front annular channel.

2. The housing as recited in claim 1 wherein the axial channel forms a common peripheral wall section together with housing.

3. The housing as recited in claim 1 wherein the axial channel extends in the peripheral direction of the housing.

4. The housing as recited in claim 1 wherein a plurality of axial channels is provided which are distributed across the housing periphery.

5. The housing as recited in claim 1 wherein the annular channels are each limited to one compressor stage.

6. The housing as recited in claim 1 wherein the fluid conveying system has at least one other annular channel having another annular space opening assigned an individually controllable valve device for opening and closing the other annular space opening.

7. The housing as recited in claim 1 wherein the fluid conveying system includes at least one peripheral channel closed toward the annular space and in fluid connection with at least one of the axial, front integral annular and rear integral annular channels.

8. The housing as recited in claim 1 wherein the at least one axial channel has a cooling device pointing toward an exterior surrounding.

9. The housing as recited in claim 1 wherein the outlet opening is capable of introducing an external fluid into the front integral or rear integral annular channels.

10. The housing as recited in claim 1 wherein inlet valves of the valve devices are pulsable.

11. The housing as recited claim 1 wherein the housing includes a plurality of segments.

12. A turbomachine comprising the housing as recited in claim 1.

13. A jet engine comprising the turbomachine as recited in claim 12.

* * * * *